L. C. BRISTOL.
Drill Cable Meter.
No. 53,564.
Patented April 3, 1866.
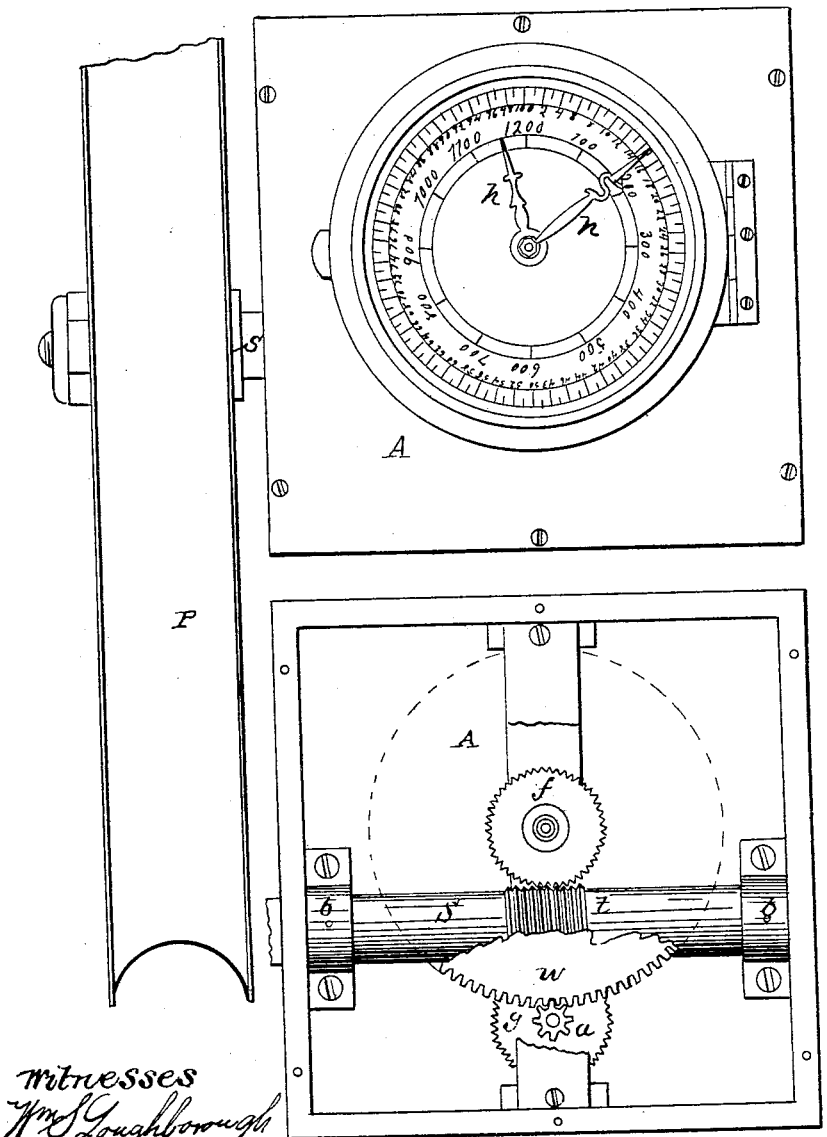

United States Patent Office.

L. C. BRISTOL, OF VICTOR, NEW YORK.

IMPROVEMENT IN DRILL-CABLE METERS.

Specification forming part of Letters Patent No. 53,564, dated April 3, 1866.

*To all whom it may concern:*

Be it known that I, L. C. BRISTOL, of Victor, in the county of Ontario and State of New York, have invented a new and useful Mode of Measuring the Depth of Oil or other Deep Wells. The apparatus for the purpose I call a "Metrum," or "Well-Boring Drill-Cable Meter;" and I do hereby declare that the following is a full, clear, and exact description thereof, reference being had to the accompanying drawings, making part of this specification, in which—

Figure 1 is a face view of my invention with a portion of the traction or cable wheel attached. Fig. 2 is an internal plan of the same, most of the multiplying-wheel $w$ being removed to show the worm or screw-shaft S and the wheel $f$, to which the long hand $h$ is attached.

Like letters indicate corresponding parts.

It is of the greatest importance that a correct record of the nature or character of the various strata through which petroleum or other deep wells are being sunk should be kept; also, the precise depth at which the drill strikes a fissure in the rock or a water-course, &c. These measurements have heretofore been taken by hand with a measuring-rod four or five feet in length applied to the cable as the drill was being drawn up. This was an extremely disagreeable job, because the cable is always very wet, dirty, and cold. Besides, it was a very slow and imperfect process, and in many wells has to be frequently repeated.

The object of this invention is to provide an automatic meter for taking these measurements and that will permit the drill to be withdrawn very rapidly. It consists in the application of a traction wheel or pulley having a suitable recording-meter attached to the drill-cable of well-boring apparatus.

To enable others to make and use my invention, I will describe its construction and application.

I use a worm or screw-shaft, S, to one end of which a traction-pulley, P, is hung. The shaft is supported in the boxes $b$ within the case A. It is provided with a threaded section, $t$, which drives the two wheels $f$ and $g$.

The large toothed wheel $w$, a section of which is shown in gear with the pinion $a$, hangs loosely upon the post of $f$, by which it is supported. The hand $h$ is attached to wheel $f$, and $h'$ to wheel $w$.

$f$ and $g$ have each fifty teeth, and consequently receive one turn to every fifty revolutions of the shaft.

The pinion $a$ has eight leaves, and the wheel $w$ ninety-six. Therefore every twelve turns of $a$ give one turn to $w$. If the circumference of the pulley P on the traction-line be two feet, then one revolution of the hand $h$ will indicate one hundred feet of measurement, and one turn of $h'$ will indicate twelve hundred feet.

The section of the pulley shown in Fig. 1 is too large for the dial and gearing represented.

It may be desirable to serrate the face of the pulley P to prevent the cable from slipping on its face, or it may be faced with rubber.

The meter is so fixed as to cause the pulley to press firmly against the cable, and there may be a traverse-pulley on the opposite side of the cable to press it against the meter-pulley, in which case the latter may have a flat face and the traverse-pulley be grooved.

What I claim as my invention, and desire to secure by Letters Patent, is—

In combination with the drill-cable, or its equivalent, of well-boring apparatus, a meter having a traction wheel or pulley, substantially as shown, for the purposes herein set forth.

L. C. BRISTOL.

Witnesses:
WM. S. LOUGHBOROUGH,
A. H. BILLINGS.